United States Patent [19]

Hannibal

[11] 4,045,948
[45] Sept. 6, 1977

[54] VIBRATION ATTENUATING SUPPORT FOR ROTATING MEMBER

[75] Inventor: Alan J. Hannibal, Fairview, Pa.
[73] Assignee: Lord Corporation, Erie, Pa.
[21] Appl. No.: 716,868
[22] Filed: Aug. 23, 1976
[51] Int. Cl.² .......................... D01H 7/10; F16F 15/12
[52] U.S. Cl. ...................................... 57/129; 57/135; 248/358 R; 308/152
[58] Field of Search ................................. 57/129–135, 57/88, 89; 248/8–10, 15, 20, 22, 358 R; 188/1 B; 308/143, 145, 152

[56] References Cited

U.S. PATENT DOCUMENTS

| | | | |
|---|---|---|---|
| 2,663,138 | 12/1953 | Geen | 57/129 |
| 2,699,033 | 1/1955 | Bell | 57/135 |
| 2,872,774 | 2/1959 | Fink | 57/129 |
| 3,049,860 | 8/1962 | Beerli | 57/135 |
| 3,088,268 | 5/1963 | Holschlag et al. | 57/135 |
| 3,314,631 | 4/1967 | Whitehill | 248/358 R X |
| 3,415,050 | 12/1968 | Page | 57/88 |
| 3,462,937 | 8/1969 | Schmid | 57/130 |
| 3,641,759 | 2/1972 | Kohler | 57/129 |
| 3,764,100 | 10/1973 | Young et al. | 248/358 R |

FOREIGN PATENT DOCUMENTS 773,614   5/1957   United Kingdom

*Primary Examiner*—John Petrakes
*Attorney, Agent, or Firm*—Maurice R. Salada

[57] ABSTRACT

A noise and vibration attenuating support mounts a rotating member that tends to tilt about and translate along axes transverse to its axis of rotation. The support incorporates a body having mass and a moment of inertia with respect to an axis through the center of gravity of the body. Resilient elements, which are secured to the mass body, mount the rotating member resiliently relative to the mass body and the mass body resiliently relative to a second member. When mounting the rotating member, the support circumscribes and is coupled to the member such that the center of gravity of the rotating member is spaced along the axis of rotation from the center of gravity of the mass body. The support also predominately determines a translational natural mode of vibration with an associated natural frequency at which the mass body translates in resonance along axes transverse to the axis of rotation of the rotating member. Similarly, the support predominately determines a cocking natural mode of vibration with an associated natural frequency at which the mass body cocks or tilts in resonance about axes transverse to the axis of rotation of the rotating member. To reduce the transmission of vibrations from the rotating member to the second member, the mass and moment of inertia of the mass body and the stiffnesses of the resilient elements are such that the natural frequencies of the translational and cocking modes of vibration both fall outside of a frequency range corresponding to a predetermined normal rotational speed range of the rotating member. In addition, at least one of the natural frequencies falls below the frequency range corresponding to the predetermined rotational speed range of the rotating member.

18 Claims, 9 Drawing Figures

VIBRATION ATTENUATING SUPPORT FOR ROTATING MEMBER

BACKGROUND OF THE INVENTION

There are many circumstances in which it is desirable to prevent vibrations in one structure or member from being transmitted to an adjacent structure or member. Such vibration isolation is often desirable, for example, in industrial machinery. In a drop forge, a press, or mechanical power transmission equipment, for example, vibrations are set up by the action of the moveable components of the machinery. The vibrations are transmitted to other components in the machinery and to nearby structures, such as the floor on which the machinery is supported. High levels of transmitted vibration tend to increase noise levels in work areas, to cause damage to sensitive recording and other instrumentation, and to interfere with the proper operation of machinery.

In order to prevent the transmission of vibrations from machinery, for example, to adjacent structures, resilient mountings or supports are commonly used to mount the machinery on a floor or other supporting surface. Resilient mountings or supports may also be provided within the machinery to isolate the moving components, which represent a source of vibrations, from other parts of the machinery. When the individual mountings are simple springs, such as bodies of elastomer, the mountings, at low frequencies of vibration, transmit essentially all of the vibrational forces to adjacent and/or supporting structures. As the frequency of vibration begins to increase, the mountings typically transmit to the adjacent and/or supporting structures forces which are greater than the vibrational forces acting on the supported member or component. The increase in the force transmitted, as compared to the force acting on the supported member, peaks at what is known as a "natural" frequency of vibration of the system that comprises the supported member, the resilient mounting or support, and the supporting member or structure. Beyond the natural frequency, the ratio of force transmitted to the force on the supported member decreases to less than one. Thus, at higher frequencies of vibration, the forces transmitted to the supporting member or structure are substantially less than the forces acting on the supported member. The range of frequencies at which transmitted force is less than the force on the supported member is known as the isolation range of the resilient mounting.

In the isolation range of vibrational frequencies of a simple or one-stage resilient mounting or support, the percentage of vibrational force that is transmitted to an adjacent and/or supporting structure or member is, to some extent, a function of the stiffness of the mounting. Thus, if the mounting is fabricated of a less stiff or more resilient material, a smaller percentage of the exciting force will be transmitted from the supported structure or member to the supporting structure or member at any given frequency in the isolation range of the mounting. At the same time, however, the deflection experienced by a mounting in response to any given force is also affected by the resilience of the mounting. Thus, as the stiffness of the mounting decreases, the supported member moves through a greater distance in response to a predetermined force. With respect to machinery, large movements between adjacent structures often cannot be accommodated. Within a machine, the space between any two components may be limited. Between the machine and the floor of a factory, for example, large movements of the machine may be possible, yet the movements may make operation of the machine substantially more difficult, if not impossible. Unacceptably large movements may result either from dynamic loads or from static loads such as the weight of the machinery.

Especially in situations where movements and deflections are critical, another approach may be utilized to reduce the percentage of force that is transmitted from the supported structure or member to the supporting structure or member or, stated another way, to reduce the transmissibility of a mounting. More specifically, the mounting is constructed to incorporate two resilient elements separated by an intermediate element that has a mass of relative significance (e.g. at least 5% of the mass of the supported member). With such a "two-stage" isolator that incorporates an intermediate mass or mass body, vibrational forces from the supported structure or member must pass through both of the resilient elements and through the intermediate mass before reaching the supporting structure or member. The vibrational forces will excite the intermediate mass element to produce another natural frequency of the system that comprises the supported and supporting members and the mounting. The natural frequency that is determined primarily by the intermediate mass will typically occur at a higher frequency than the natural frequency that results from resiliently mounting the supported member on a simple, one-stage mounting. Consequently, the isolation range of a two-stage mounting begins at a higher frequency than the isolation range of a similar single stage mounting. On the other hand, the decrease in the transmissibility of the two-stage mounting in its isolation range is more rapid and of a greater magnitude than the decrease in transmissibility afforded by a single-stage mounting. The basic advantages of a two-stage or intermediate mass type mounting have previously been recognized, as is illustrated by Whitehill U.S. Pat. No. 3,314,631, assigned to the assignee of the present invention, and Young et al U.S. Pat. No. 3,764,100.

The Whitehill and Young et al patents describe and illustrate two different two-stage or intermediate mass type resilient mountings or supports that may be utilized to reduce the transmission of vibrational forces from a supported structure or member to a supporting structure or member where the forces produce translational (e.g. vertical or lateral) movements of the supported member. The Whitehill patent also recognizes that the vibrational forces acting on a supported member may include forces that tend to produce tilting or cocking motions of the supported member. To suppress the tilting or cocking modes of vibration, Whitehill proposes to utilize several two-stage resilient mountings. Each mounting is located a substantial distance laterally from the center of gravity of the supported member and, thus, has a substantial moment arm for resisting tilting movements of the supported member. Whitehill also suggests that the mountings be located so as to act substantially in a horizontal plane through the center of gravity of the supported member. Consequently, while the Whitehall patent offers some suggestions on how to isolate vibrations that produce tilting or cocking movements of a supported member, the patent does not offer any solutions for situations in which mountings can not be placed either so as to act through the center of gravity of the supported member or a substantial distance laterally from the center of gravity of the supported member.

A textile spindle is one example of a machinery element which is subject to vibrational forces that cannot be isolated from the supporting structure in accordance with the teachings of the Whitehill patent. A textile spindle must be mounted near one of its ends in order that its other end may be free to accept the package of yarn which is being wound on the spindle. Consequently, a vibration isolating mounting for the spindle can not be arranged to act in a horizontal plane through the center of gravity of the spindle. In addition, textile spindles are typically mounted through openings formed only a few inches apart in a long supporting rail. The limited space between adjacent spindles, which permits maximum production in a minimum of space, also prohibits, as a practical matter, using several two-stage mountings spaced at distances from the spindle sufficiently large to produce moment arms that will resist tilting movements of the spindle.

SUMMARY OF THE INVENTION

The present invention is directed to a support for mounting a rotating member, such as a textile spindle, on a second member, such as a textile machinery rail. The rotating member will normally rotate at a speed within a predetermined range of rotational speeds. While rotating, the member will tend to tilt about and translate along axes transverse to its axis of rotation. The support of the present invention utilizes the concept of an intermediate mass to reduce the transmission of vibrations from the rotating member to the second member on which the rotating member is mounted. The support comprises a body that has mass and a moment of inertia with respect to an axis which passes through the center of gravity of the body and is disposed transverse to the axis of rotation of the rotating member. The mass body also has an opening formed in it. Secured to the mass body is a resilient element that mounts the rotating member relative to the mass body. Also secured to the mass body is a second resilient element that mounts the mass body relative to the second or supporting member. The support is dimensioned and configured to circumscribe the rotating member and its axis of rotation. The support is also coupled to the rotating member so that the member extends into the opening in the mass body and has its center of gravity spaced along the axis of rotation from the center of gravity of the mass body.

By having the support and its component mass body circumscribe a rotating member that both translates and tilts in response to vibrational forces, practical operation of the rotating member is controlled by resonances of the system (which is defined by the rotating member, the support, and the supporting member) other than the system resonances recognized by the prior art. With specific reference to FIG. 8 of the Whitehall patent mentioned previously, it can be seen that the use of a two-stage or intermediate mass type mounting or support introduces into a mounting system a natural frequency of vibration in addition to the natural fequency that occurs when utilizing a simple, one-stage mounting. The second natural frequency, which is at a higher frequency than the first natural frequency, is primarily attributable to motion of the intermediate mass of the two-stage mounting. At the second natural frequency, the intermediate mass is translating, either vertically or horizontally, in resonance. In view of the location of the natural frequency of the translational mode of vibration determined predominantly by the intermediate mass, and in view of the improved vibration isolation achieved at frequencies above the intermediate mass-determined natural frequency, Whitehill suggests that his intermediate mass type mounting or support be designed such that the natural frequency of the translational mode of vibration determined by the intermediate mass will fall below the primary frequencies at which the mounting system is excited. What the Whitehall patent does not recognize, however, is the importance of the natural frequencies of cocking modes of vibration which are determined by cocking or tilting movements of the rotating member and of the intermediate mass. As discussed previously, Whitehill seeks to avoid or minimize the importance of cocking modes of vibration through the use of two techniques that are of limited or no value in mounting a rotating member such as a textile spindle. Depending upon the primary frequency at which the system is excited (e.g. the rotational speed of the rotating member), the natural frequencies of the cocking modes of vibration determined by the intermediate mass and the rotating member may represent substantial impediments to proper operation of the machinery to be isolated.

The present invention recognizes the existence and importance of the natural frequencies associated with the cocking modes of vibration determined by the rotating member and the mass body. The invention also reflects the discovery that the natural frequency associated with the cocking mode of vibration primarily determined by the mass body is generally the natural frequency that next follows the natural frequency associated with the translational mode of vibration determined by the mass body. The invention further reflects the discovery that the natural frequencies of the translational and cocking modes of vibration determined by the mass body can be calculated, with reasonable accuracy, without direct consideration of the mass or other characteristics of the rotating member that is being mounted. In accordance with the foregoing discoveries, it is a basic feature of the present invention that the mass and inertia of the intermediate mass or mass body and the stiffnesses of the resilient elements in the inventive support are such that the natural frequencies of the translational and cocking modes of vibration determined predominately by the mass body both fall outside of a frequency range corresponding to the normal rotational speed range of the rotating member. In addition, at least one of the natural frequencies determined by the mass body must fall below the frequency range corresponding to the rotational speed range of the rotating member. In a preferred embodiment of the invention, the mass and moment of inertia of the mass body and the stiffnesses of the resilient elements are such that the natural frequencies of the translational and cocking modes of vibration determined by the mass body fall on opposite sides of the frequency range corresponding to the predetermined rotational speed range of the rotating member.

In selecting the mass and moment of inertia of the mass body and the stiffnesses of the resilient elements so as to position the natural frequencies in accordance with the invention, the system defined by the rotating member, the support and the supporting member may be analyzed as a mass (i.e. the mass body) mounted by two springs (i.e. the resilient elements) between two immovable structures (i.e. the rotating member and the supporting member). Although the foregoing analysis ignores the freedom of movement of the rotating member, as well as other aspects of the system, computer simulations and experimental test results have shown that the analysis is sufficiently accurate to design properly functioning supports in many instances. For example, a computer simulation of a textile spindle mounted on a textile machinery rail by a support constructed in accordance with the present invention considered the spindle-rail-support system to have 8° of freedom. The translational vibratory movements of interest were translational movements of components of the system radially of the axis of rotation of the spindle. Based on the simulation, the natural frequency associated with the translational mode of vibration determined by the mass body of the support was calculated to be 143 hertz. The natural frequency associated with the cocking mode of vibration determined by the mass body was calculated to be 851 hertz. Utilizing the simplified analysis presented above and the formulas given below, the natural frequencies were calculated to be 141 hertz and 846 hertz, respectively. It is recognized that the simplified analysis of a system incorporating a support according to the present invention may not be sufficiently accurate for all situations. Accordingly, certain parameter limitations which may govern the use of the simplified analysis and the formulas given below are set out after the formulas.

The natural frequency of the translational mode of vibration determined predominately by the mass body of a support according to the present invention may be considered to be generally defined by the expression $$\frac{1}{2\pi}\sqrt{\frac{K_{T1} + K_{T2}}{m}}.$$

In the foregoing expression, $K_{T1}$ is the dynamic translational stiffness in pounds per inch (lb./in.) of the resilient element that mounts the rotating member relative to the mass body, $K_{T2}$ is the dynamic translational stiffness in pounds per inch (lb./in.) of the resilient element that mounts the mass body relative to the supporting member or structure, and $m$ is the mass in pounds-seconds squared per inch (lb.-sec.$^2$/in.) of the mass body. Similarly, the natural frequency of the cocking mode of vibration determined predominately by the mass body may be generally defined by the expression $$\frac{1}{2\pi}\sqrt{\frac{K_{C1} + K_{C2}}{I}}.$$

In this latter expression, $K_{C1}$ is the dynamic tilting or cocking stiffness with respect to the center of gravity of the mass body and expressed in pound-inches per radian (lb.-in./rad.) of the resilient element that mounts the rotating member relative to the mass body. $K_{C2}$ is the dynamic tilting or cocking stiffness with respect to the center of gravity of the mass body and expressed in pound-inches per radian (lb.-in./rad.) of the resilient element that mounts the mass body relative to the supporting structure. I is the moment of inertia in inch-pounds-seconds squared (in.-lb.-sec.$^2$) of the mass body with respect to an axis passing through the center of gravity of the mass body perpendicular to the axis of rotation of the rotating member. The foregoing expressions are most likely to give accurate results when the following ratio ranges are also observed: mass of the mass body/mass of the rotating member = 0.10 to 1.25; moment of inertia of the mass body with respect to its center of gravity/moment of inertia of the rotating member with respect to its center of gravity = 0.001 to 0.200; $K_{T2}/K_{T1}$ = 1.00 to 10.00; $K_{C2}/K_{C1}$ = 1.00 to 50.00. In the case of a textile spindle, the mass of the "rotating" member should be considered to include both the mass of the rotating spindle blade and the mass of any non-rotating spindle bolster carried by the support.

One particular embodiment of the present invention is a noise and vibration attenuating support for a textile spindle. The support includes a rigid sleeve that has a tubular body portion and an integral, radially outwardly extending, annular flange. The body portion of the sleeve is dimensioned to receive a textile spindle. An annular body of elastomer is secured to the sleeve and encircles the body portion of the sleeve so that a radially extending surface of the body of elastomer is juxtaposed with the flange of the sleeve. An annular body having a predetermined mass and moment of inertia is secured to another radially extending surface of the body of elastomer, opposite the first radially extending surface, so as to be everywhere spaced from the sleeve. A radially extending surface of a second annular body of elastomer is also secured to the mass body. Secured to a second radially extending surface of the second body of elastomer is a rigid ring that may be attached to a supporting structure, such as a machine rail, for the spindle. The ring is everywhere spaced from both the sleeve and the mass body.

With respect to embodiments of the present invention which are for mounting textile spindles, it should be recognized that a textile spindle support according to the invention differs in design and function from mountings which have previously been proposed for textile spindles and which have generally similar structures. Thus, for example, British Pat. No. 773,614, Polyakovsky et al U.S. Pat. No. 3,500,624, and FIG. 5 of Olowinski et al U.S. Pat. No. 3,885,767 all show mountings for textile spindles which bear some general structural similarities to embodiments of the present invention. None of the foregoing patents, however, recognizes the principles involved in the present invention nor are the mounting structures shown in the patents designed to function in the same manner as the present invention. Beerli U.S. Pat. No. 3,049,860 does recognize the desirability of controlling the cocking movements of a textile spindle. Beerli adds a counterweight to the bottom of a spindle bolster resiliently mounted in a textile machine rail in an effort to control cocking movements of the spindle blade with respect to the bolster. The Beerli patent states, at column 4, lines 37-47, that various parameters of a spindle and mounting must be considered when selecting the size and position of a counterweight, in order to avoid critical speeds of rotation. Nonetheless Beerli does not recognize either the concept of an intermediate mass type mounting or the importance of the modes of vibration which are determined by the intermediate mass of such a mounting.

BRIEF DESCRIPTION OF THE DRAWINGS

For a better understanding of the invention, reference may be made to the following description of several exemplary embodiments, taken in conjunction with the figures of the accompanying drawings, in which.

DESCRIPTION OF THE EMBODIMENTS

Figure 1:
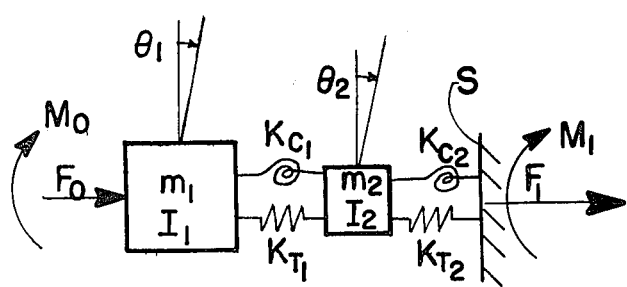
FIG. 1 is a schematic representation of a two mass system in which the masses both translate and tilt in response to vibrational forces.

FIG. 1 of the drawings illustrates schematically a compound or two mass vibrating system. In the system of FIG. 1, a mass $m_1$ is resiliently mounted to a somewhat smaller mass $m_2$. Mass $m_2$, in turn, is resiliently mounted to a substantially fixed and motionless surface S. Mass $m_1$ is subjected to vibrational inputs which are represented by a force $F_0$ and amoment $M_0$. The force $F_0$ and the moment $M_0$ cause mass $m_1$ to translate to the right in FIG. 1 and to tilt or cock about its center of gravity through an angle $\theta_1$. The translation and cocking of the mass $m_1$ are resisted by a resilient element interposed between the mass $m_1$ and the mass $m_2$. The resilient element has a resistance to translational movements which is expressed as $K_{T1}$ and a resistance to cocking movements which is expressed as $K_{C1}$.

Some of the vibrational force and moment imposed on the mass $m_1$ are taken up and absorbed by deflection of the resilient element interposed between the masses $m_1$ and $m_2$. Nonetheless, the mass $m_2$ also experiences a force and a moment which cause the mass $m_2$ to translate laterally (e.g. to the right) and to tilt or cock about its center of gravity through an angle $\theta_2$. The translation and cocking of the mass $m_2$ are resisted by a second resilient element, which is interposed between the mass $m_2$ and the surface or support S. The second resilient element, which has a resistance to translational movement designated $K_{T2}$ and a resistance to cocking movements designated $K_{C2}$, deflects to accommodate and absorb some of the force and moment imposed by the mass $m_2$. The resulting force and moment experienced by the surface S are expressed as $F_1$ and $M_1$, respectively.

Figure 2:
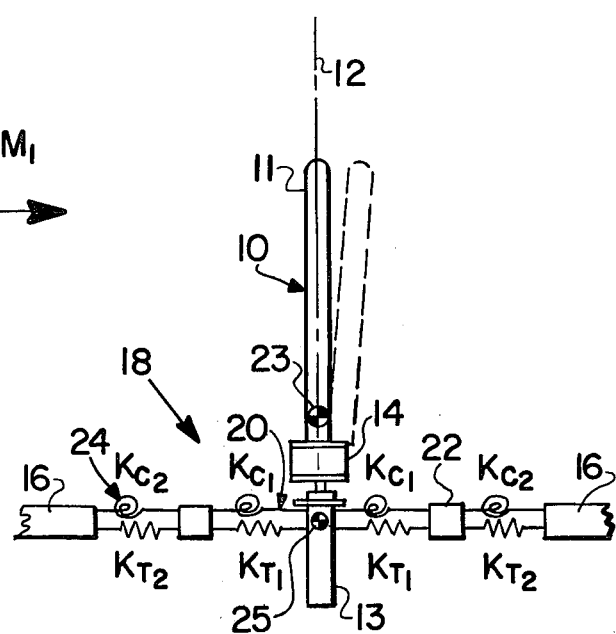
FIG. 2 is a schematic representation of a two mass system as applied to a support for a textile spindle.

FIG. 2 of the application drawings schematically illustrates a real-life two mass vibratory system. In the system of FIG. 2, the primary mass or $m_1$ is represented by a textile spindle 10. The spindle 10 includes a rotatable blade 11 and a non-rotatable bolster 13, which carries the blade at one end. The spindle blade 11 is rotated about its longitudinal axis 12, which is also the longitudinal axis of the spindle 10, by a drive tape (not shown) that engages the whorl 14 of the spindle. As it rotates, the spindle blade 11 is subject to vibratory forces and moments which cause the spindle 10 to move laterally along and to cock or tilt about axes transverse to its longitudinal axis 12, as shown in phantom in FIG. 2. One important source of the vibratory forces and moments is the yarn package (not shown) that is carried by the spindle blade 11. The yarn package includes a tubular carrier (not shown), which fits over the spindle blade 11, and the yarn that is wound on the carrier. Since the carriers are not precisely formed, the yarn package is often slightly eccentric to the longitudinal axis 12 of the spindle. As a result, when the spindle blade 11 is rotated at several thousand revolutions per minute, centrifugal force causes the spindle 10 to move away from its initial position and introduces vibrational forces and moments into the spindle mounting system.

In order to reduce the transmission of vibrations from the spindle 10 to the textile machinery rail 16 on which the spindle is mounted, a resilient support 18 is used to mount the spindle 10 on the rail 16. In conventional spindle mounting arrangements, the support 18 would typically consist of a single annular resilient member such as a body of elastomer. According to the present invention, however, the support 18 incorporates a mass body 22 that is resiliently secured to the spindle 10, at its bolster 13, and to the rail 16 to form a two-mass vibratory system. Thus, the support 18 includes a resilient element 20 that circumscribes the spindle 10 and mounts the spindle to the intermediate mass or mass body element 22. The mass body 22, which corresponds to the mass $m_2$ of FIG. 1, circumscribes both the resilient element 20 and the spindle 10 and is secured to the resilient element. The body 22 is mounted to the rail 16 by a second resilient element 24. The second resilient element 24 circumscribes the mass body 22 and is secured to both the mass body and the machine rail 16. When mounted on the rail 16, the spindle 10 has its center of gravity 23 vertically displaced from the center of gravity 25 of the support 18 and the mass body 22.

Figure 3:
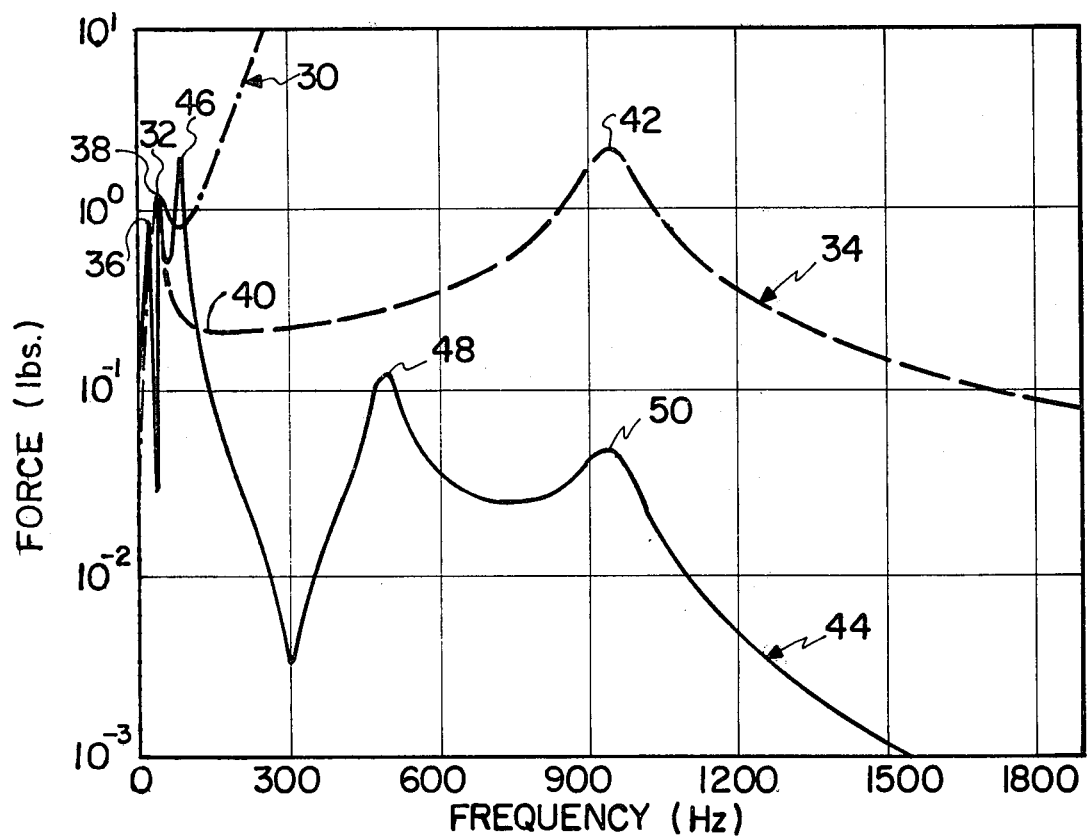
FIG. 3 is a graphical representation of the forces experienced by a textile machinery rail in response to vibrations from a rotating textile spindle mounted on the rail (a) with a conventional single-stage mounting and (b) with a two-stage or intermediate mass type mounting or support in accordance with the present invention.

The benefits of incorporating the mass body or intermediate mass 22 in the support 18 are illustrated in graphical form in FIG. 3 of the application drawings. FIG. 3 presents a comparison between a hypothetical one-stage resilient support and a two-stage resilient support, each of which mounts the same textile spindle on a textile machinery rail. In the computer simulation utilized to generate the data shown in FIG. 3, it was assumed that each of the two supports mounted a commercially available spindle marketed under the tradename "Whitin N3". It was also assumed that the elastomeric elements for each of the supports had the same static and dynamic stiffnesses. Essentially the only difference between the two supports under consideration in FIG. 3 is the inclusion of a 1.65 lb. intermediate mass or mass body element in the two-stage support. The mass of the mass body is approximately 0.69 times the mass of the spindle.

FIG. 3 presents the amplitude of vibrational force transmitted to the machine rail ($F_1$) plotted logarithmically against vibrational frequency (i.e. spindle blade rotational speed) in hertz or cycles per second. For each support, the amplitude of the exciting force on the spindle (Fo) is of the form $m_s e\omega^2$, where $m_s$ is the mass of the spindle blade, $e$ is the eccentricity of the spindle, and $\omega$ is the rotational speed of the spindle blade. Since $m_s$ and $e$ are assumed to remain constant, the exciting force on the spindle increases as the square of rotational speed.

The transmission of force to the machine rail as a result of mounting the spindle directly to the rail is represented by the dash-dot-dash line 30 in FIG. 3. Line 30 rises to an initial peak 32 at about 45 hertz or 2700 revolutions per minute of the blade of the textile spindle. The peak 32 designates a natural frequency of the vibrating spindle. At such a natural frequency, the force transmitted to the rail may actually be greater than the exciting force acting on the spindle. Beyond the peak 32, the line 30 dips downwardly to a low at about 80 hertz and then rises continuously with increasing frequency of vibration (i.e. spindle rotational speed).

The force transmission performance of the single-stage resilient support is represented by the dashed line 34. The line 34 rises to an initial peak 36 at approximately 12 hertz or 720 revolutions per minute of the textile spindle blade. The peak 36 designates a natural frequency of the vibratory system that includes the textile spindle, the support and the machinery rail. A second natural frequency of the vibratory system that includes the single-stage support falls at approximately 45 hertz and is represented by the peak 38 in the line 34. Although it does not appear as a peak on the line 34, a third natural frequency of the vibratory system occurs at about 136 hertz. The absence of any rise in the line 34 or in the force transmitted to the rail may be explained by the possibility that the mode of vibration of the system at 136 hertz produces a nodal point or point of no movement where the support meets the rail.

After the peak 38, the line 34 drops sharply to a low point or valley 40 at about 150 hertz, or 9,000 revolutions per minute of the blade of the textile spindle. The valley 40 in the line 34 represents a significant reduction in the force being transmitted to the machinery rail, particularly in comparison with "hard mounting" the spindle (see line 30). Beyond 150 hertz, the line 34 rises gradually to a peak 42 at approximately 945 hertz, which represents yet another natural frequency of the vibratory system that is defined by the spindle, the machine rail, and the single-stage support. Beyond the peak 42, the line 34 gradually slopes continuously down below the initial low point 40 between the peaks 38 and 42.

As can be seen in FIG. 3, a single-stage resilient support for a textile spindle can offer a significant reduction in the force transmitted to a textile machinery rail, as compared with mounting the spindle directly on the rail. The particular single-stage support under consideration in FIG. 3 offers improved performance at all vibrational frequencies or spindle blade speeds above about 45 hertz. The performance of the single-stage mounting above 45 hertz is important because the blades of textile spindles typically run at speeds of from 6,000 to 14,000 revolutions per minute, or 100 to 235 hertz. Nonetheless, above about 150 hertz, the performance of the single-stage mounting represented in FIG. 3 begins to degrade. Consequently, as spindle blade speeds rise above about 9,000 revolutions per minute, the vibrational force transmitted to the machine rail and the resultant noise in the adjacent work area will rise with increasing spindle blade speed.

The use of a two-stage support, according to the present invention, to mount a textile spindle on a machine rail provides a performance advantage over the use of a single-stage support. The force transmitted to the machinery rail when utilizing a two-stage support constructed as discussed above is represented by the solid line 44 in FIG. 3. Line 44 includes two initial peaks which are substantially identical to the peaks 36 and 38 in line 34. The peaks represent natural frequencies of the vibratory system that includes the spindle, the machine rail, and the two-stage support. At about 86 hertz, the line 44 has a third peak 46, which extends to about 91 hertz. The peak 46 represents two natural frequencies, one at 86 hertz and one at 91 hertz. It has been found that the natural frequency at 91 hertz is determined primarily by lateral translational movements of the mass body or intermediate mass of the two-stage support. As can be seen, the natural frequencies represented by the peak 46 occur at the same general location as some of the better performance of the single-stage support. Nonetheless, beyond the peak 46 at 91 hertz, the line 44 drops sharply and falls below the line 34 at about 125 hertz. Thereafter, despite the appearance of two more peaks 48 and 50, which are located at about 500 hertz and 945 hertz, respectively, the line 44 remains below the line 34. Thus, FIG. 3 illustrates that a two-stage support for a spindle can provide significant increases in vibration and noise isolation both in the higher ranges of conventional spindle blade rotational speeds and in the subsequent speed ranges in which future spindles may operate to achieve increased production.

The full benefits of a two-stage support, as illustrated in FIG. 3 of the drawings, do not arise solely from substitution of a two-stage support for a single stage support. To realize the improved performance characteristics of a two-stage support in a useful frequency range, there must be appropriate selection of (a) the mass and moment of inertia of the mass body in the two-stage support and (b) the dynamic translational and cocking stiffnesses of the resilient elements interposed between the intermediate mass or mass body and the spindle, on the one hand, and the rail, on the other hand. Proper selection of the foregoing characteristics has been found to determine the position or location of certain frequencies of the system that is comprised of the spindle, the rail and the support. More particularly, it has been discovered that critical natural frequencies of the system are determined predominately by motions of the intermediate mass or mass body of a two-stage support. Proper design of the support can position these natural frequencies favorably relative to the exciting frequencies of the system, particularly the operating speed of the spindle (i.e. the rotational speed of the spindle blade). The discovery of the importance of and the ability to control the location of the natural frequencies in question represents a major advance beyond the more general, yet still applicable, principle that the natural frequencies of a spindle-support-rail system should be avoided when operating the spindle.

Figure 4:
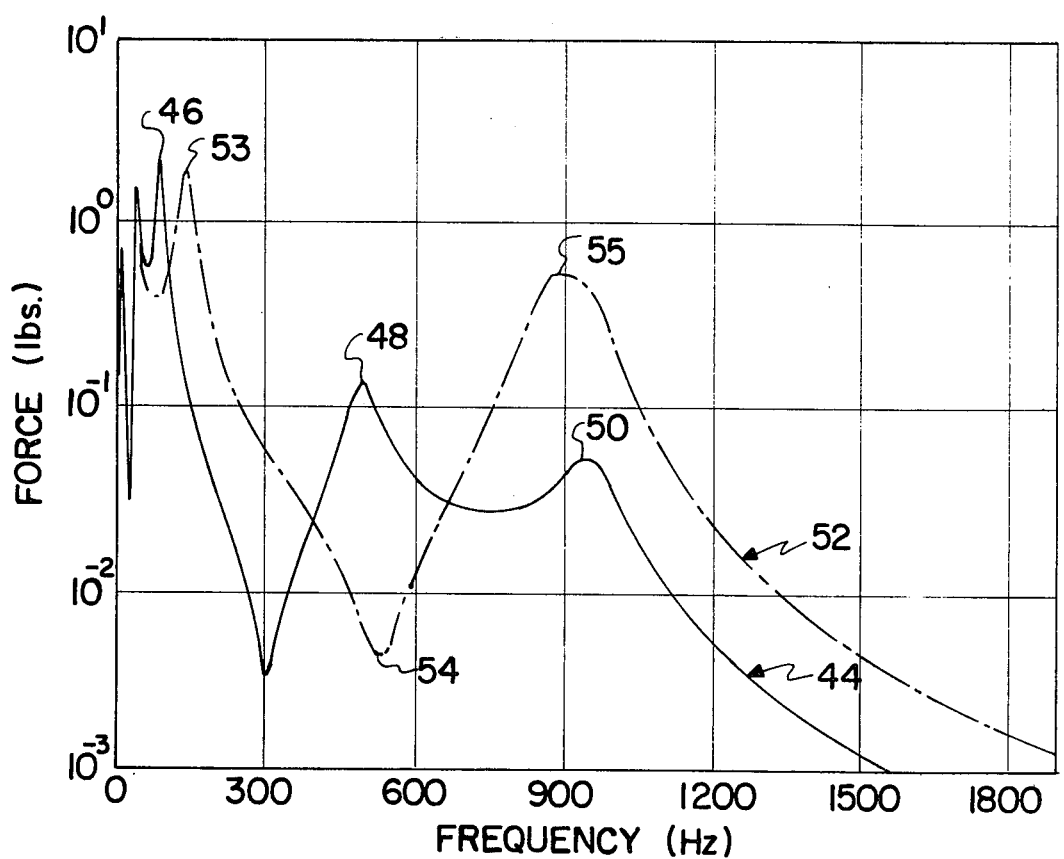
FIG. 4 is a graphical representation similar to FIG. 3 and compares the performance of the two-stage support of FIG. 3 with the performance of another two-stage support according to the present invention.
Figure 5:
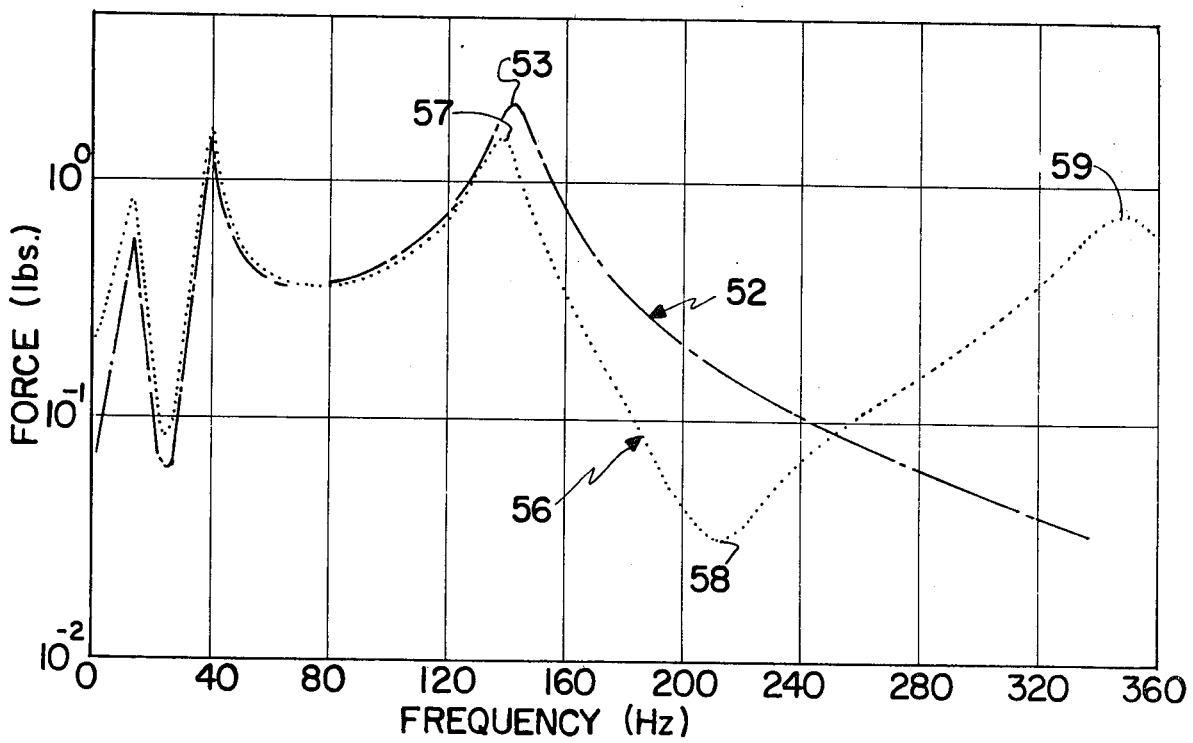
FIG. 5 is a graphical representation similar to FIG. 4 and compares the performance of the second two-stage support of FIG. 4 with yet another two-stage support according to the present invention.

FIGS. 4 and 5 of the application drawings illustrate the necessity of and the advantages arising from proper selection of the mass of the mass body in a two-stage support and proper selection of the dynamic cocking stiffnesses of the resilient elements in such a support. In FIG. 4, the performance of the two-stage support considered in FIG. 3 is again represented by a solid line 44. Dot-dash line 52, in FIG. 4, represents the performance of a substantially identical two-stage support that has a mass body which weighs only 0.55 lb., rather than 1.65 lb.

The dot-dash line 52 in FIG. 4 has two initial peaks that are substantially coincident with the first two peaks in line 44. The third peak 53 in line 52, however, is displaced to the right with respect to the corresponding peak 46 of line 44. Similarly, the valley 54 and the peak 55 that follow the peak 53 are also displaced to the right with respect to their counterparts in line 44. The peak 55 actually designates not one, but two natural frequencies of the vibratory system related to line 52. One natural frequency, which occurs at about 850 hertz, is associated with a cocking mode of vibration determined predominately by cocking of the mass body of the two-stage support included in the system related to line 52. The other natural frequency designated by peak 55 occurs at about 945 hertz. The natural frequency at 850 hertz corresponds to the natural frequency designated by the peak 48 in line 44. Similarly, the other natural frequency designated by the peak 55 in line 52 corresponds to the natural frequency represented by the peak 50 in line 44. The absence of two distinct peaks in line 52, at 850 and 945 hertz, respectively, may be explained by the type of spindle being utilized and the closeness of the two natural frequencies.

By comparing lines 44 and 52 in FIG. 4, it can be seen that a mere reduction in the weight of the mass body utilized in a two-stage support will cause an upward shift in certain natural frequencies of the system that includes the spindle, the rail, and the support. These critical natural frequencies, designated by the peaks 46 and 48 in line 44 and by the peaks 53 and 55 in line 52, are associated with modes of vibration determined predominately by vibratory movements of the mass body of the two-stage support. The shift in natural frequencies associated with a decrease in the weight of the mass-body of the support shifts from 125 hertz to 210 hertz the beginning of the range of frequencies in which the two-stage support isolates vibrations better than a similar one-stage support. Given that most spindles of "spinning" size do not operate at speeds above about 14,000 revolutions per minute or 235 hertz, the practical usefulness of the two-stage support having the 0.55 lb. mass body is limited.

FIG. 5 of the application drawings compares the performance of the two-stage support having the 0.55 lb. mass body, as described above, with the performance of a substantially identical support that incorporates resilient elements with lower dynamic cocking stiffnesses. The dot-dash line 52 represents, on an enlarged scale, the performance of the 0.55 lb. two-stage support considered in FIG. 4. The performance of the support with softer resilient elements (softer in cocking only) is represented by the dotted line 56. The line 56 has two initial peaks that are substantially concident with the first two peaks of line 52. The third peak 57 of line 56, which corresponds to the peak 53 of line 52, is displaced slightly downward and to the left in comparison with peak 53. A valley 58 follows the peak 57 in line 56 and corresponds to the valley 54 which follows the peak 53 in line 52. Valley 58 does not, however, extend as deeply as the valley 54 and terminates much sooner in a peak 59.

As is illustrated by FIG. 5, a decrease in the cocking stiffnesses of the resilient elements of a two-stage support will produce a corresponding decrease in the natural frequency of the mode of vibration determined predominately by cocking of the mass body of the two-stage support. The decrease or shift in the natural frequency results in a downward shift from 210 hertz to 170 hertz of the beginning of the range of frequencies in which the softer 0.55 lb. two-stage support isolates vibrations better than a similar one-stage support having a dynamic cocking stiffness identical to the stiffer 0.55 lb. two-stage support. At the same time, however, the degree of isolation achieved at frequencies below the natural frequency associated with the cocking mode of vibration determined predominately by the mass body decreases with decreasing cocking stiffness of the resilient elements. In addition, there is a reduction in the range of frequencies at which the softer 0.55 lb. two-stage support will outperform a comparable single-stage support having a dynamic cocking stiffness identical to the stiffer 0.55 lb. two-stage support.

It is theoretically possible to bring the peak 59 in FIG. 5 quite close to the peak 57 by continuing to decrease the cocking stiffnesses of the resilient elements in the support. The result of such a continuing decrease in the cocking stiffnesses of the resilient elements might well be to permit the operating speed range of the spindle fall on the right hand or descending side of the peak 59. Although it would be advantageous to have the normal rotational speed range of a spindle fall on the descending side of the peak 59, the softness of the resilient elements in the supports would produce large static deflections of the spindle. Since spindles must be relatively plumb or vertical in order to assure proper operation, including proper winding of the yarn on a yarn carrier, large static deflections of a spindle are objectionable. Nonetheless, in other installations that incorporate a two-stage support as described above, large static deflections may not be objectionable. Thus, it may be acceptable to adjust the cocking stiffnesses of the resilient elements in a two-stage or intermediate mass support so as to bring the natural frequencies represented by the peaks 57 and 59 as close together as possible.

Figures 6, 7:
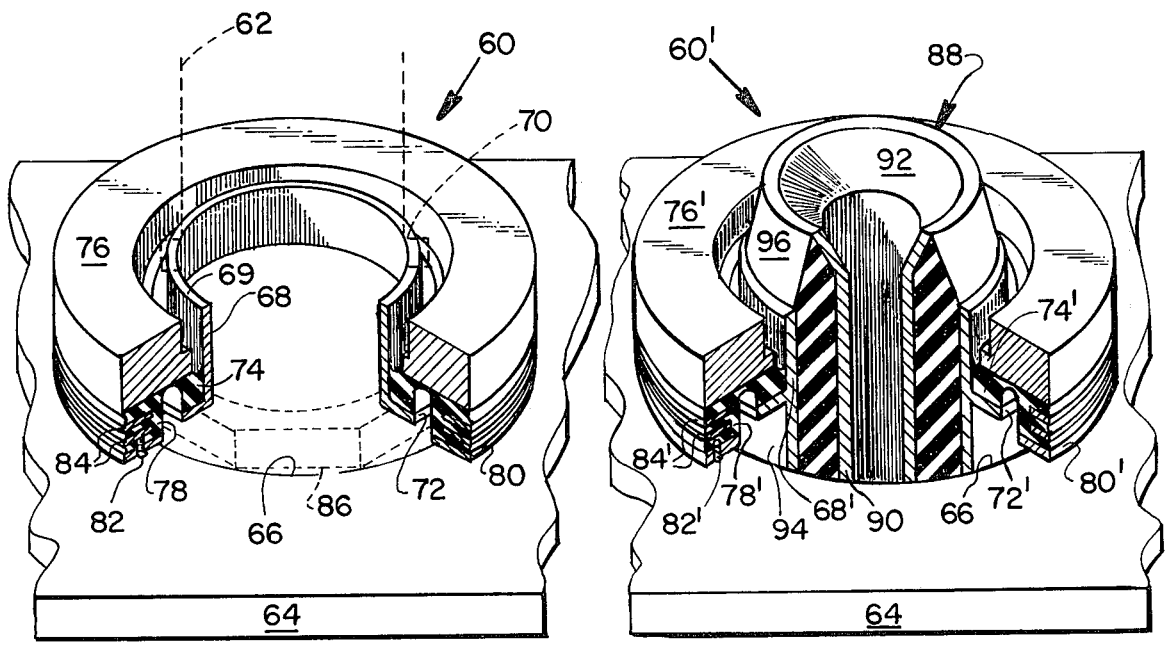
FIG. 6 is a perspective view, partly in section, of one embodiment of a support for a textile spindle in accordance with the present invention.
FIG. 7 is a perspective view, partly in section, or a modified version of the support shown in FIG. 6.

Turning now to specific structures that embody the present invention, there is shown in FIG. 6 a two-stage or intermediate mass type support 60 for mounting a textile spindle 62 (shown in phantom) on the rail 64 of a textile machine. The support 60 is generally annular and is centered about an opening 66 formed in the machine rail 64 to receive the textile spindle 62. The support 60 includes an inner sleeve 68 fabricated of material, such as metal, which is relatively stiff compared to the resilient material used in the support. The sleeve 68 has a tubular body portion of the sufficiently large diameter to receive the textile spindle 62. The upper edge 69 of the sleeve 68 receives a flange 70 formed on the textile spindle 62 to support the spindle in the opening 66 in the textile machinery rail 64. The lower end of the sleeve 68 has an integrally formed and radially outwardly extending annular flange 72. The outer circumference of the flange 72 is of smaller diameter than the opening 66.

Bonded to the upper radially extending surface of the flange 72 of the sleeve 68 and bonded to the outer circumference of the body portion of the sleeve is an annular body of resilient material 74, such as elastomer. The body of elastomer 74 has a generally square shape in radial section and has an outer circumference of essentially the same diameter as the outer circumference of the flange 72. The upper radially extending surface of the body of elastomer 74 is bonded in part to an overlying, contiguous surface of an annular rigid intermediate mass or mass body 76. The interior circumference of the mass body 76 is of larger diameter than the outer circumference of the body portion of the sleeve 68, but is of smaller diameter than the outer circumference of the flange 72. Thus, the mass body 76 can move radially relative to the sleeve 68 through shearing of the body of elastomer 74. The mass body 76 may be fabricated of any material, although a metal, such as steel, is generally used. The mass body may also have any shape, not just circular, for its inner and outer circumferences. The use of the term "annular" to describe the mass body is intended to include non-circular, hollow configurations.

Bonded to the same radially extending surface of the mass body 76 as the body of elastomer 74 is a second annular body of resilient material, such as elastomer, 78. The inner circumference of the second body of elastomer 78 is approximately equal to the diameter of the opening 66 in the machine rail 64. Thus, the elastomer body 78 is also larger about its interior circumference than the outer circumference of the body of elastomer 74 and the outer circumference of the flange 72. At the same time, the outer circumference of the second body of elastomer 78 is approximately the same as the outer circumference of the intermediate mass or mass body 76. The body of elastomer 78 is supported on the machine rail 64 by a ring 80 fabricated of metal, for example. The ring 80 has approximately the same inner and outer dimensions as the body of elastomer 78 and is releasably secured to the machine rail 64 by screws 82. The screws 82 extend through circumferentially spaced apart openings in the machine rail 64 and are screwed into threaded and circumferentially spaced holes in the ring 80.

Both bodies of elastomer 74 and 78 are bonded to their adjacent metal parts, either by vulcanization, adhesive bonding or some other conventional method. In addition, the body of elastomer 78 has embedded in it two annular shims 84, which are fabricated of any material that is relatively nonextensible as compared to the elastomer. The shims 84 will typically be fabricated of metal but may be fabricated of other materials, such as reinforced plastics, graphite fiber composites, and sheets of fiberglass. The shims 84 are evenly spaced apart along the length of the support 60 and have approximately the same inner and outer diameters. Although the body of elastomer 74 does not include shims, such shims may be included in the body of elastomer 74, if required, as explained below.

In operation, the support 60 is placed on the machine rail 64 and centered about the opening 66 in the rail. Screws 82 are inserted through the openings in the machine rail and are screwed into the threaded holes in the ring 80 of the support 60. With the support 60 secured on the rail 64, the textile spindle 62 is lowered into the central opening in the support until the flange 70 formed on the spindle rests on the upper edge 69 of the sleeve 68. In this position, the spindle 62 will "overhang" the support 60 with the center of gravity of the spindle being located above the centers of gravity of the support and its mass body 76. The support 60 sustains the weight of the spindle 62. To insure that the spindle 62 does not move upwardly in an axial direction relative to the support 60, a nut 86 (shown in phantom) is screwed on to the bottom of the spindle 62 and tightened against the flange 72 on the sleeve 68. As can be seen from FIG. 6 of the application drawings, the nut 86 can be circumscribed by a circle of smaller diameter than the opening 66 in the rail 64.

With the textile spindle 62 supported on the machine rail 64 by the support 60, the spindle blade may be rotated to wind yarn on a yarn package (not shown) carried by the spindle. As the spindle blade rotates, the spindle 62 will vibrate so as to translate both axially and radially and so as to tilt or cock about its longitudinal axis (i.e. the axis of rotation of the spindle blade). Radial translational movements of the spindle 62 are readily accommodated through shearing of the bodies of elastomer 74 and 78. The shearing is permitted because of the spacing between the sleeve 68, which carries the spindle, and the intermediate mass or mass body 76. The flange 72 does not extend into the opening 66 in the machine rail 64 so that motion of the sleeve 68 is not impeded by contact between the flange 72 and the machine rail. The mass body 76 is also free to translate radially, through shearing of the bodies of elastomer 74 and 78, with respect to the ring 80 that is secured to the machine rail 64.

Axial movements of the spindle 62 relative to the machine rail 64 are accommodated and resisted through compression and tension loading of the bodies of elastomer 74 and 78. Since elastomer is typically stiffer or more resistant to compression and tension loadings than it is to shear loading, the spindle 62, and the mass body 76, will be relatively more free to translate radially than to translate axially. The foregoing phenomenon also causes the support 60 to have a higher resistance to tilting or cocking movements of the spindle 62 than to radially translatory movements of the spindle. Tilting or cocking movements of the spindle 62 about axes transverse to its longitudinal axis will also tend to cause similar tilting or cocking of the mass body or intermediate mass 76 about its center of gravity. The forces acting to produce tilting or cocking will cause compression loading of at least part of at least one of the bodies of elastomer 74 and 78. The remainder of each annular body of elastomer may also be compressed, but less highly, or may be subject to tension loading. It is the compression loading of the bodies of elastomer that primarily provides the cocking stiffness for the support 60. The addition of the shims 84 in the body of elastomer 78 helps to increase the compression stiffness of the body of elastomer. A more detailed discussion of the principle involved in incorporating rigid shims in a body of elastomer may be obtained by referring to Wildhaber U.S. Pat. No. 2,752,766 and Hinks U.S. Pat. No. 2,900,182, for example. The use of shims in a resilient single-stage support for a textile spindle is shown in Kohler U.S. Pat. No. 3,641,759.

With the construction of the support 60 shown in FIG. 6, the intermediate mass or mass body 76 is free to translate, both axially and radially, and to tilt or cock independently of the other metal components of the support, such as the sleeve 68, which moves with the textile spindle 62. The freedom of the mass body 76 to move within the constraints provided by the resilient members 74 and 78 provides the necessary two-stage vibration isolation and noise reduction feature of the support 60. Although the support 60 is shown being mounted to the upper side of a machine rail 64, it would also be possible simply to invert the support 60 and mount it to the bottom of the machine rail 64.

FIG. 7 of the application drawings illustrates a modified form of the support 60 shown in FIG. 6. In FIG. 7, parts that correspond to parts illustrated in FIG. 6 are shown with primed reference numerals. The support 60' of FIG. 7 has been combined with the bolster portion 88 of a textile spindle marketed under the tradename "New Era" by Platt Saco Lowell Corporation of Greenville, S.C. The support ring 80', the intermediate mass or mass body 76', and the bodies of elastomer 74' and 78' of the mounting 60' are essentially identical to their counterparts shown in FIG. 6 of the application drawings. The sleeve 68', on the other hand, is now an integral portion of the textile spindle bolster 88.

The bolster 88 comprises an inner tubular member 90 that has a conically or spherically shaped flange 92 at one end. The inner tubular member 90 receives an elongated rod (not shown) which forms the base of a spindle blade and which is secured to the bottom of the bolster 88 by a nut (not shown) threaded on the rod. Encircling the tubular member 90 and spaced radially from it is a second tubular member 94. Both tubular members 90 and 94 are fabricated of a rigid material, such as metal. The tubular member 94 incorporates the sleeve 68' and the flange 72'. Bonded between the two tubular members 90 and 94 is an annular body of relatively hard or stiff elastomer 96. The stiffness of the elastomer 96 is such, in comparison to the stiffnesses of the elastomer bodies 74' and 78', that it has no substantial effect on the functioning of the support 60'. The operation of the support 60' shown in FIG. 7 is essentially identical to the support 60 shown in FIG. 6.

Figures 8, 9:
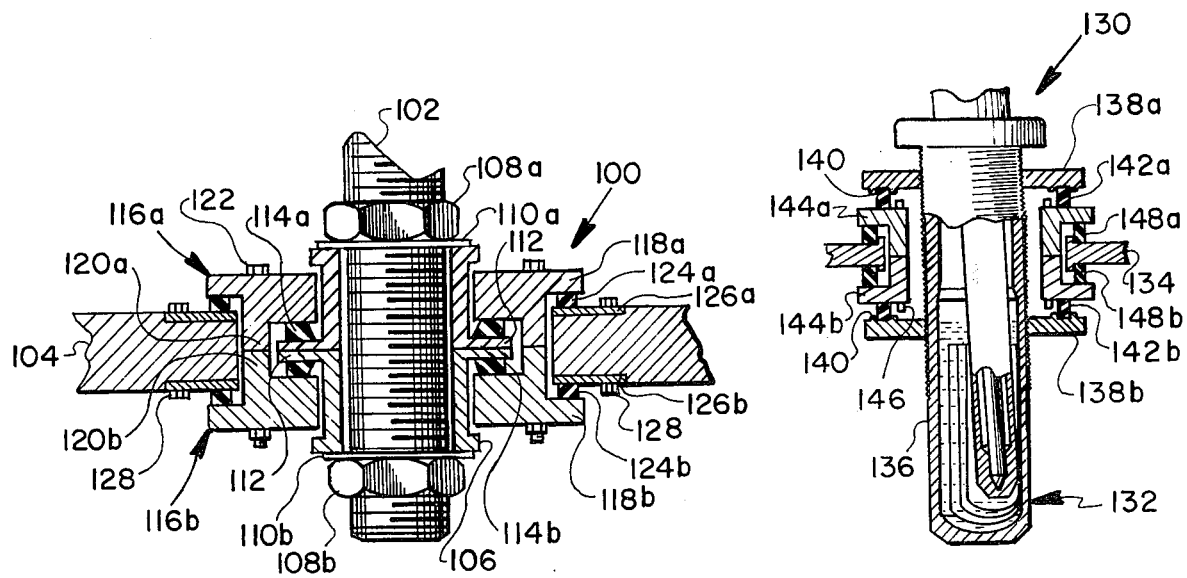
FIG. 8 is a sectional view of another embodiment of a support in accordance with the present invention.
FIG. 9 is a sectional view of yet another embodiment of a support for a textile spindle in accordance with the present invention.

FIG. 8 of the application drawings illustrates an embodiment of the present invention which may be utilized in situations where the axial and radial dimensions of a support for a textile spindle are not critical. In FIG. 8, a support 100, according to the present invention, mounts a textile spindle 102 to a textile machinery rail 104. The radially innermost component of the support 100 is a two part tubular member 106 of relatively stiff material which encircles the spindle 102. Lock nuts 108a and 108b and washers 110a and 110b are disposed above and below the tubular member 106 on the spindle 102 to hold the tubular member in place and the halves of the member together. The exterior of the spindle 102 is threaded to permit the lock nuts 108a, 108b to be screwed onto the spindle. Approximately midway along the length of the tubular member 106 is a radially outwardly extending annular flange 112. The flange 112 is in two halves, like the member 106, and each half is integral with a half of the tubular member 106. Adjacent and bonded to each of the upper and lower radially extending surfaces of the flange 112 is an annular body of elastomer 114a or 114b. The elastomer bodies 114a and b are spaced radially from the adjacent outer circumference of the tubular member 106.

The radially extending surface of each of the bodies of elastomer 114a and b opposite the flange 112 of the tubular member 106 is secured to a radially extending surface of one of a pair of annular mass body halves 116a and 116b. As shown in FIG. 8, each mass body half 116a or 116b includes an annular, radially outwardly extending flange 118a or 118b and an annular axially extending flange 120a or 120b. Adjacent radially extending surfaces of the axially extending flanges 120a and 120b are placed in contact with each other and are held together by bolts 122 which extend through aligned openings in both axial flanges 120a and 120b. The radially extending flanges 118a and 118b of the mass body halves 116a and 116b are bonded to two more annular bodies of elastomer 124a and 124b. The opposite sides of the bodies of elastomer 124a and 124b are bonded, in turn, to annular plates 126a and 126b. The plates 126a and b are held on the machine rail 104 by fitting them into recesses cut into the machine rail. Lug bolts 128 secure the plates 126 to the rail 104.

When assembled as shown in FIG. 8 of the application drawings, the support 100 is more complicated and cumbersonme than the supports 60 and 60'. On the other hand, the support 100 offers the advantage of having the center of gravity of the mass body, which is comprised of the mass body halves 116a and 116b, precisely at the combined elastic center of the four resilient elements 114a, 114b, 124a and 124b.

FIG. 9 of the application drawings illustrates yet another embodiment of the present invention, which is similar to the support 100 of FIG. 8. The support 130 of FIG. 9 has a smaller radial dimension than the support 100 but has a greater axial dimension than the support 100. In FIG. 9, the support 130 mounts an oil base spinning spindle 132 to a machine rail 134. In the support 130, the innermost tubular member or sleeve 136 is actually the outer casing of the spindle bolster. Two lock nuts 138a and 138b are screwed onto the threaded exterior of the casing 136 at an axial distance apart to provide radially extending flanges. Adjacent the periphery of each nut 138a or 138b is a pair of raised ridges 140 which fall on either side of an annular resilient member 142a or 142b. The ridges 140 prevent the resilient members 142a and 142b from shifting radially of the spindle 132. The resilient members 142a and 142b are bodies of elastomer and are not bonded to the lock nuts 138a and 138b.

The radially extending surfaces of the bodies of elastomer 142a and 142b opposite the lock nuts 138a and 138b are bonded to radially extending surfaces of mass body halves 144a and 144b, respectively. Each mass body half 144a or 144b is L-shaped in radial section so as to provide an axially extending flange that mates with the other mass body half. The two mass body halves 144a and 144b are held together in axial contact by bolts 146 which extend through aligned openings in the axial flange portions of both mass body halves. Between the radially extending flange portion of each mass body half 144a or 144b and the machine rail 134 is another annular body of resilient material 148a or 148b, such as a body of elastomer. The bodies of elastomer 148a and 148b are bonded to the radially extending flange portions of the mass body halves 144a and 144b, respectively. On the other hand, the bodies of elastomer 148a and 148b only frictionally engage the machine rail 134.

It will be understood that the embodiments of the invention described above are merely exemplary and that persons skilled in the art may make many variations and modifications without departing from the spirit and scope of the invention. All such modifications ad variations are intended to be within the scope of the invention as defined in the appended claims.

What is claimed is:

1. A support for mounting a rotating first member on a second member and for reducing the transmission of vibrations from said rotating first member to said second member, the first member being rotatable about an axis and tending while rotating to tilt about and translate along axes transverse to said axis of rotation, the first member also normally being rotated at a speed within a predetermined range of rotational speeds, said support comprising:

a. a body having mass and a moment of inertia with respect to an axis passing through the center of gravity of the mass body transverse to said axis of rotation, the mass body also having formed in it an opening;

b. means secured to the mass body for mounting the first member resiliently relatively to the mass body; and c. means secured to the mass body for mounting the mass body resiliently relative to the second member, the support being dimensioned and configured to circumscribe the first member and its axis of rotation and to be coupled to the first member such that the first member, when mounted in the support, extends into the opening in the mass body and has a center of gravity which is spaced along the axis of rotation from the center of gravity of the mass body, the support, when mounting the first member, predominately determining (i) a translational natural mode of vibration with an associated natural frequency at which the mass body translates in resonance along axes transverse to the axis of rotation of the first member and (ii) a cocking natural mode of vibration with an associated natural frequency at which the mass body cocks or tilts in resonance about axes transverse to the axis of rotation of the first member, the mass and moment of inertia of the mass body and the stiffnesses of the mounting means being such that both of said natural frequencies of the translational and cocking modes of vibration fall outside of a frequency range corresponding to the predetermined rotational speed range of the first member and such that at least one of said natural frequencies falls below the frequency range corresponding to the predetermined rotational speed range of the first member.

2. A support, according to claim 1, wherein the natural frequency of the translational mode of vibration is generally defined by the expression $$\frac{1}{2\pi}\sqrt{\frac{K_{T1} + K_{T2}}{m}},$$

where $K_{T1}$ is the dynamic translational stiffness in pounds per inch (lb./in.) of the means for mounting the first member resiliently relative to the mass body, $K_{T2}$ is the dynamic translational stiffness in pounds per inch (lb./in.) of the means for mounting the mass body resiliently relative to the second member, and $m$ is the mass in pounds-seconds squared per inch (lb.-sec.²/in.) of the mass body;

and wherein the natural frequency of the cocking mode of vibration is generally defined by the expression $$\frac{1}{2\pi}\sqrt{\frac{K_{C1} + K_{C2}}{I}},$$

where $K_{C1}$ is the dynamic tilting or cocking stiffness in inch-pounds per radian (in.-lb./rad.) of the means for mounting the first member resiliently relative to the mass body, $K_{C2}$ is the dynamic tilting or cocking stiffness in inch-pounds per radian (in.-lb./rad.) of the means for mounting the mass body resiliently relative to the second member, amd $I$ is the moment of inertia in inch-pounds-seconds squared (in.-lb.-sec.²) of the mass body, each of said dynamic cocking stiffnesses being determined with respect to the center of gravity of the mass body, and said moment of inertia being determined with respect to an axis passing through the center of gravity of the mass body transverse to the axis of rotation of the first member.

3. A support, according to claim 1, wherein said natural frequencies of the translational and cocking modes of vibration fall on opposite sides of the frequency range corresponding to the predetermined rotational speed range of the first member.

4. A support, according to claim 3, wherein the natural frequency of the translational mode of vibration falls below the frequency range corresponding to the predetermined rotational speed range of the first member, and the natural frequency of the cocking mode of vibration falls above said frequency range.

5. A support, according to claim 4, wherein a range of frequencies defined by and between the natural frequencies of the translational and cocking modes of vibration is free of any other natural frequency of a mode of vibration determined predominately by the support and free of any natural frequency of a mode of vibration determined predominately by the first member.

6. A support, according to claim 1, wherein the mounting means defined a composite elastic center that is generally coincident with the center of gravity of the mass body.

7. A noise and vibration attenuating support for a textile spindle, the spindle having a blade member which is rotatable about the longitudinal axis of the spindle and is normally rotated at a speed within a predetermined range of rotational speeds, said support comprising:

a. a body having mass and a moment of inertia with respect to an axis passing through the center of gravity of the mass body transverse to the longitudinal axis of the spindle, the mass body also having formed in it an opening;

b. means secured to the mass body for mounting the textile spindle resiliently relative to the mass body; and c. means secured to the mass body for mounting the mass body resiliently relative to a supporting structure, the support being dimensioned and configured to circumscribe the spindle and to engage the spindle such that the spindle, when mounted in the support, extends into the opening in the mass body and has a center of gravity which is spaced along the longitudinal axis of the spindle from the center of gravity of the mass body, the support, when mounting the spindle, predominately determining (i) a translational natural mode of vibration with an associated natural frequency at which the mass body translates in resonance along axes transverse to the longitudinal axis of the spindle and (ii) a cocking natural mode of vibration with an associated natural frequency at which the mass body cocks or tilts in resonance about axes transverse to the longitudinal axis of the spindle, the mass and moment of inertia of the mass body and the stiffnesses of the mounting means being such that both of said natural frequencies of the translational and cocking modes of vibration fall outside of a frequency range corresponding to the predetermined rotational speed range of the spindle blade member and such that at least one of said natural frequencies falls below the frequency range corresponding to the predetermined rotational speed range of the spindle blade member.

8. A support, according to claim 7, wherein the natural frequency of the translational mode of vibration is generally defined by the expression $$\frac{1}{2\pi}\sqrt{\frac{K_{T1} + K_{T2}}{m}},$$

where $K_{T1}$ is the dynamic translational stiffness in pounds per inch (lb./in.) of the means for mounting the spindle resiliently relative to the mass body, $K_{T2}$ is the dynamic translational stiffness in pounds per inch (lb./in.) of the means for mounting the mass body resiliently relative to the supporting structure, and $m$ is the mass in pounds-seconds squared per inch (lb.-sec.$^2$/in.) of the mass body;

and wherein the natural frequency of the cocking mode of vibration is generally defined by the expression $$\frac{1}{2\pi}\sqrt{\frac{K_{C1} + K_{C2}}{I}},$$

where $K_{C1}$ is the dynamic tilting or cocking stiffness in inch-pounds per radian (in.-lb./rad.) of the means for mounting the spindle resiliently relative to the mass body, $K_{C2}$ is the dynamic tilting or cocking stiffness in inch-pounds per radian (in.-lb./rad.) of the means for mounting the mass body resiliently relative to the supporting structure, and I is the moment of inertia in inch-pounds-seconds squared (in.-lb.-sec.$^2$) of the mass body, each of said dynamic cocking stiffnesses being determined with respect to the center of gravity of the mass body and said moment of inertia being determined with respect to an axis passing through the center of gravity of the mass body transverse to the axis of rotation of the spindle blade member.

9. A support, according to claim 7, wherein said natural frequencies of the translational and cocking modes of vibration fall on opposite sides of the frequency range corresponding to the predetermined rotational speed range of the spindle blade member.

10. A support, according to claim 9, wherein the natural frequency of the translational mode of vibration falls below the frequency range corresponding to the predetermined rotational speed range of the spindle blade member, and the natural frequency of the cocking mode of vibration falls above said frequency range.

11. A support, according to claim 10, wherein a range of frequencies from the natural frequency of the translational mode of vibration to the natural frequency of the cocking mode of vibration is free of any other natural frequency of a mode of vibration determined predominately by the support and free of any natural frequency of a mode of vibration determined predominately by the spindle.

12. A support, according to claim 7, wherein the mounting means define a composite elastic center that is generally coincident with the center of gravity of the mass body.

13. A support, according to claim 7, wherein the means for mounting the spindle resiliently relative to the mass body includes:

a. an annular body of resilient material secured along a first surface to the mass body; and
b. a tubular member disposed within an inner circumference of the body of resilient material and secured to a second surface of said body of resilient material opposite the first surface, the tubular member being dimensioned to receive the spindle.

14. A support, according to claim 13, wherein the tubular member has an annular flange that extends radially outwardly from the tubular member and is juxtaposed with a radially extending surface of the body of resilient material, the mass body of the support being secured to a surface of the body of resilient material opposite said radially extending surface.

15. A support, according to claim 13, wherein the means for mounting the mass body resiliently relative to the supporting structure includes:

a. a rigid ring adapted to be attached to the supporting structure, and
b. an annular body of resilient material having a first radially extending surface secured to the mass body and a second radially extending surface which is opposite said first surface and which is secured to the rigid ring.

16. A support, according to claim 15, wherein the tubular member, the mass body and the rigid ring are all spaced from one another and are disposed relative to each other and to the bodies of resilient material such that translational movements of the spindle cause shear loading of at least one body of resilient material and tilting movements of the spindle cause compression loading of at least a portion of at least one body of resilient material.

17. A support, according to claim 16, wherein each annular body of resilient material is a body of elastomer, and wherein the means for mounting the mass body resiliently relative to the supporting member also includes at least one annular shim of substantially nonextensible material embedded in the body of elastomer of said mounting means.

18. A noise and vibration attenuating support for a textile spindle, the spindle having a blade member which is rotatable about the longitudinal axis of the spindle and is normally rotated at a speed within a predetermined range of rotational speeds, said support comprising:

a. a rigid sleeve having a tubular body portion and an integral radially outwardly extending annular flange, the body portion of the sleeve being dimensioned to receive the textile spindle;
b. a first annular body of elastomer secured to the sleeve and encircling the body portion of the sleeve, a first radially extending surface of said body of elastomer being juxtaposed with the flange of the sleeve;
c. an annular body having a predetermined mass and being secured to a second radially extending surface of the first body of elastomer opposite the first radially extending surface, the mass body being everywhere spaced from the sleeve;
d. a second annular body of elastomer having a first radially extending surface secured to the mass body; and
e. a rigid ring adapted to be attached to a supporting structure for the spindle, the ring being secured to a second radially extending surface of the second body of elastomer opposite the first radially extending surface of said body, the ring also being everywhere spaced from the sleeve and the mass body, the support being adapted to mount the spindle such that the center of gravity of the spindle is spaced along the longitudinal axis of the spindle from the center of gravity of the mass body, the support, when mounting the spindle in the rigid sleeve, predominately determining (i) a translational natural mode of vibration with an associated natural frequency at which the mass body translates in resonance along axes transverse to the longitudinal axis of the spindle and (ii) a cocking natural mode of vibration with an associated natural frequency at which the mass body cocks or tilts in resonance about axes transverse to the longitudinal axis of the spindle, the mass and inertia of the mass body and the stiffnesses of the mounting means being such that both of said natural frequencies of the translational and cocking modes of vibration fall outside of a frequency range corresponding to the predetermined rotational speed range of the spindle blade member and such that at least one of said natural frequencies falls below the frequency range corresponding to the predetermined rotational speed range of the spindle blade member.

* * * * *